United States Patent [19]

Moncrief et al.

[11] Patent Number: 4,960,117
[45] Date of Patent: Oct. 2, 1990

[54] REAR ENTRY BOOTH AND SEAT FOR A SIT-DOWN VIDEO GAME

[75] Inventors: Rick L. Moncrief, Santa Clara; Erik J. Durfey, Los Gatos, both of Calif.

[73] Assignee: Atari Games Corporation, Milpitas, Calif.

[21] Appl. No.: 297,478

[22] Filed: Jan. 13, 1989

[51] Int. Cl.⁵ .................... A63B 71/00; A63F 7/06; G09B 11/00
[52] U.S. Cl. .................... 273/148 B; 273/85 G; 273/DIG. 28; 434/43
[58] Field of Search ........ 273/148 B, 85 G, DIG. 28; 272/18, 17; 434/29, 43, 62, 69; 297/339, 337, 338

[56] References Cited

U.S. PATENT DOCUMENTS

| D. 188,376 | 7/1960 | Hofkins et al. | D21/250 |
| D. 287,032 | 12/1986 | Funai | D21/13 |
| 2,700,227 | 1/1955 | Arkell et al. | 434/69 |
| 3,078,093 | 2/1963 | Hotkin et al. | 434/69 |
| 3,205,592 | 9/1965 | Wood, Jr. | 434/69 |
| 3,283,418 | 11/1966 | Brewer et al. | 434/69 |
| 3,902,755 | 9/1975 | Sirot | 297/339 |
| 4,464,117 | 8/1984 | Foerst | 434/69 |

FOREIGN PATENT DOCUMENTS 0845170 7/1981 U.S.S.R. ................ 434/62

Primary Examiner—Randall L. Green
Assistant Examiner—Gary Jackson
Attorney, Agent, or Firm—Irell & Manella

[57] ABSTRACT

A floor-standing video game player enclosure booth is disclosed. The enclosure booth is characterized by being a rear entry booth—that is, the player enters from the end of the booth facing the booth's front wall. The booth additionally includes a player seat. The seat is positioned within the enclosure booth so that, when occupied by a player who is looking directly forward toward the front wall, that player's horizontal field of view is interrupted on at least about 180° by the front and side walls of the enclosure. In this configuration, the front and side walls substantially eliminate distractions and permit the player to focus his energies and attention on the game. The open rear permits substantial numbers of spectators to participate in the game without distracting the player. In preferred embodiments, the player seat is movable, closer to and further from the front wall, so as to give a plurality of game-playing positions adapted for larger and smaller game players. Means for accomplishing this seat movement are disclosed.

16 Claims, 5 Drawing Sheets

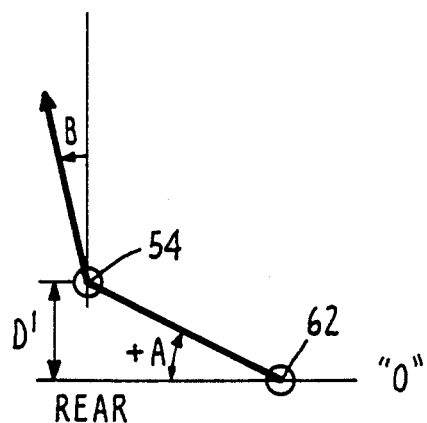
FIG.5A.
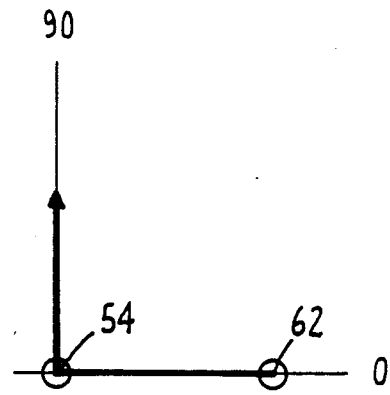
FIG.5B.
FIG.5.
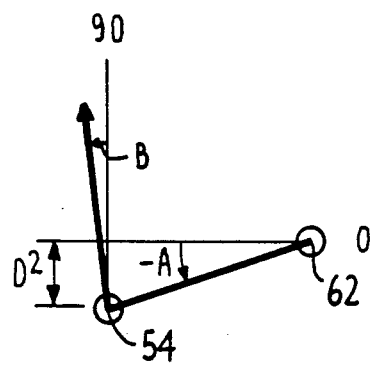
FIG.5C
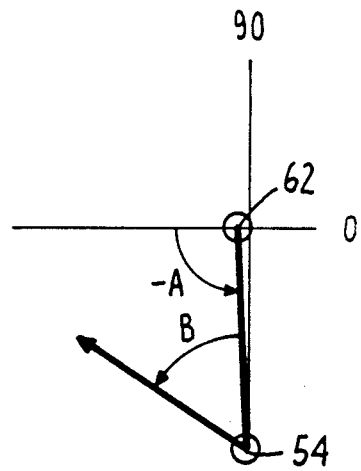
FIG.5D

REAR ENTRY BOOTH AND SEAT FOR A SIT-DOWN VIDEO GAME

BACKGROUND OF THE INVENTION

1. Field of the Invention

This invention pertains to the field of sit-down arcade video games. More particularly it relates to an improved booth or enclosure for housing a player of a sit-down arcade video game.

2. Background Information

Arcade video games are regularly increasing in sophistication. In many of today's arcade video games it is desired to immerse the player in a particular environment, for example, in a driving simulation game the player is placed in an auto cockpit looking at a screen presenting a road or race course In a battle simulation game, the player is placed in a warship, tank or the like and sent onto a battlefield presented by a video screen.

For a game to achieve maximum impact it is desirable to try to really immerse a player in the game and to try to involve the player in the game to the maximum most realistic extent possible. The goal is to focus the player's attention as completely as possible on his or her participation in the game.

One way to immerse a player is to provide a hugely stimulating experience which heavily loads the players' sensory inputs with audio and visual effects and overwhelms distractions. However, in the typical video arcade environment, games and players are stacked shoulder-to-shoulder with one another providing massive distraction opportunities.

Another way to immerse a player is to suppress distracting visual and auditory inputs such as by providing a booth or other enclosure which shields a player from these distractions. A number of such booths have been provided heretofore. While these booths do achieve some degree of isolation, they have unattractive characteristics.

One such unattractive characteristic is that typically these booths have been "side entry", much like a conventional automobile. This layout requires a free space alongside the game for entry and exit. This uses floorspace and is inconsistent with the geometry of nonenclosed games.

Another problem has been the typical booths do not permit spectators to watch the game being played to an acceptable extent. It is important to the economics of arcades and to the competitive nature of the arcade denizens, that spectators be able to watch and enthuse over one another's play. This interaction is needed to generate enthusiasm and popularity for the game. Obviously, efforts to isolate the player and shield the player from play-interrupting distractions can be directly conflicting with the spectators' needs.

In addition, many game enclosures heretofore used have had fixed position seats. Since video arcade customers typically can range from a three foot, ten inch nine year old to a six foot, ten inch adult, the fixed seat enclosures invariably compromise the comfort and/or quality of play for some players.

It is an object of this invention to provide an improved video arcade game booth or enclosure which effectively isolates the player from distractions but which avoids, to a great extent, these failings of booths or enclosures used heretofore.

STATEMENT OF THE INVENTION

A floor-standing video game player enclosure booth which alleviates the failings of booths used heretofore has now been found. This booth is characterized by being a rear entry booth—that is, the player enters from the end of the booth facing the booth's front wall. The booth includes an elevated base which has a front end, a rear end and two sides. Generally the booth is rectangular with the sides being longer than the ends. A front wall is affixed to the front end of the base and extends upwards from the front end of the base. Similarly, the two side walls are affixed to and extend upwards from the sides of the base. There is a roof affixed to the upper edges of the front wall and side walls so as to form an open-at-the-rear booth. The booth additionally includes a player seat. This seat is mounted to the base and provides a game playing position in which the player faces the front wall. The front wall would typically carry a video display as well as game playing implements. The seat is positioned within the enclosure booth so that, when occupied by a player who is looking directly forward toward the front wall, that player's horizontal field of view is interrupted on at least about 180° by the front and side walls. In this configuration, the front and side walls substantially eliminate distractions and permit the player to focus his energies and attention on the game. The open rear permits substantial numbers of spectators to participate in the game without distracting the player.

In preferred embodiments the top surfaces of the side walls are tapered toward the rear of the booth and the roof slopes upward toward the rear of the booth. Similarly in preferred embodiments the rear edges of the side walls may be tapered backwards toward the rear of the roof of the enclosure booth.

In other preferred embodiments, the player seat is movable, closer to and further from the front wall, so as to give a plurality of game-playing positions adapted for larger and smaller game players. In these various positions, however, the enclosure booth provides the at least about 180° field of view interruption. In yet other embodiments the seat may be moved to positions further to the rear of the rearmost game-playing position to facilitate entry and exit by the player. In these entry and exit positions, it is advantageous if the seat is rotatable, also to facilitate entry and exit.

DETAILED DESCRIPTION OF THE INVENTION

Brief Description of the Drawings

In this description of the invention reference will be made to the attached drawings in which:

FIG. 5 is a diagram illustrating in four views, 5A, 5B, 5C and 5D four representative game-playing positions and entry/exit positions achieved with the adjustable seat.

DESCRIPTION OF PREFERRED EMBODIMENTS

Figure 1:
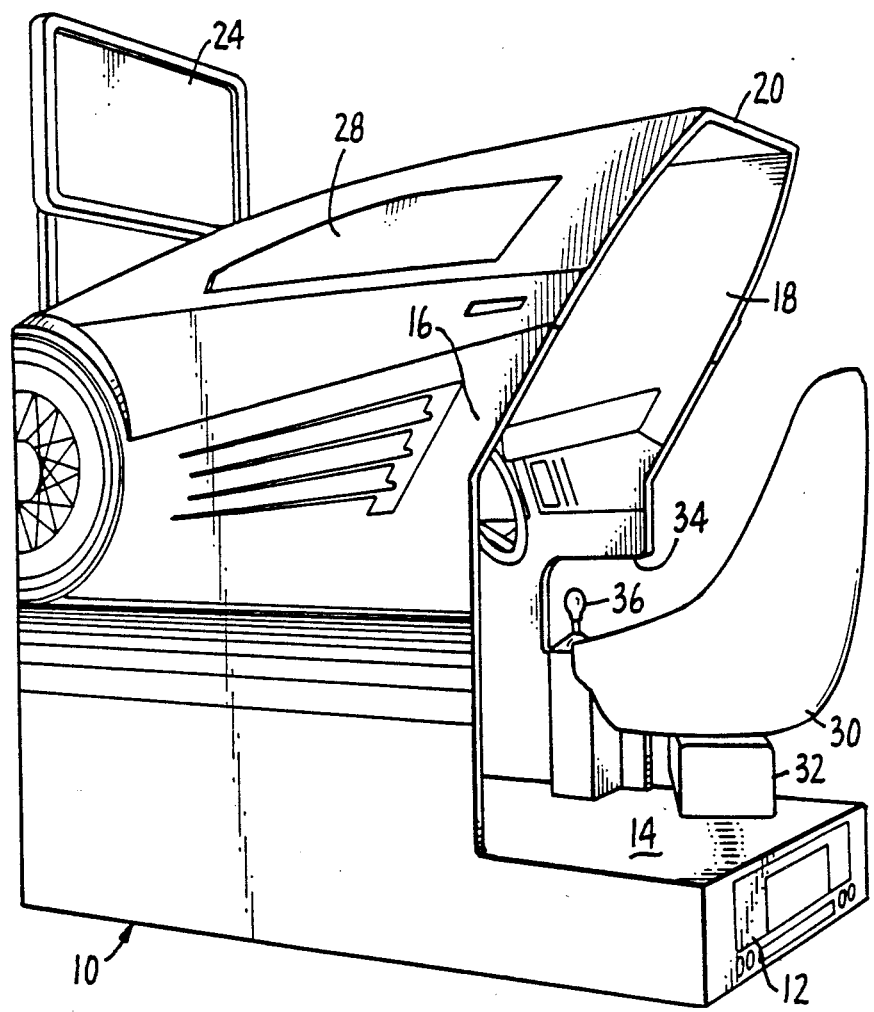
FIG. 1 is a side-oriented perspective view of a typical rear entry booth in accord with this invention.
Figure 2:
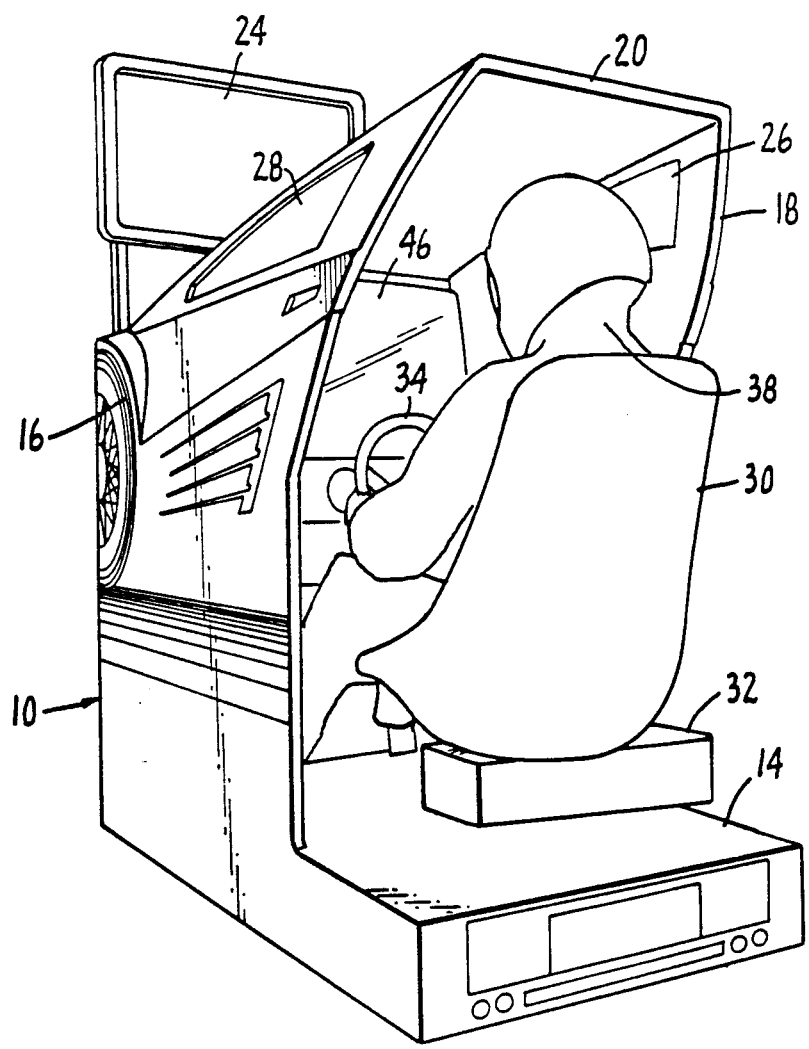
FIG. 2 is a substantially rear oriented perspective view of the same booth.

Turning now to FIGS. 1 and 2 a video arcade enclosure booth 10 is shown. The booth 10 includes an elevated base 12. The elevation of base 12 serves two functions. First it allows the mechanism, for adjusting the seat to be contained wholly under its floor 14 thus eliminating hazards. It also permits the seat height to be substantially low relative to the floor 14. This gives a realistic driving position and makes it difficult for the player to stand up except when his or her feet are going to touch the floor upon which the base 12 is situated. The enclosure 10 includes side walls 16 and 18 which are affixed to base 12 and extend upwards to meet a front wall 22 (not shown in FIG. 1 but located substantially beneath sign 24 and shown as wall 22 in FIG. 2) also contacts enjoins with side walls 16 and 18 and roof 20 to create a closed front, open rear enclosure. If desired, for game realism the walls may include items such as windows 26 and 28.

In the embodiment shown the side walls taper toward the rear at their top. Similarly the side walls are tapered upward on a front-to-rear basis. Roof 20 is sloped accordingly. This gives an enclosed cockpit-like feel to the enclosure.

Other features shown in FIGS. 1 and 2 include seat 30 located on seat support tube 32, steering wheel 34 and simulated gearshift 36, and game player 38.

Figure 3:
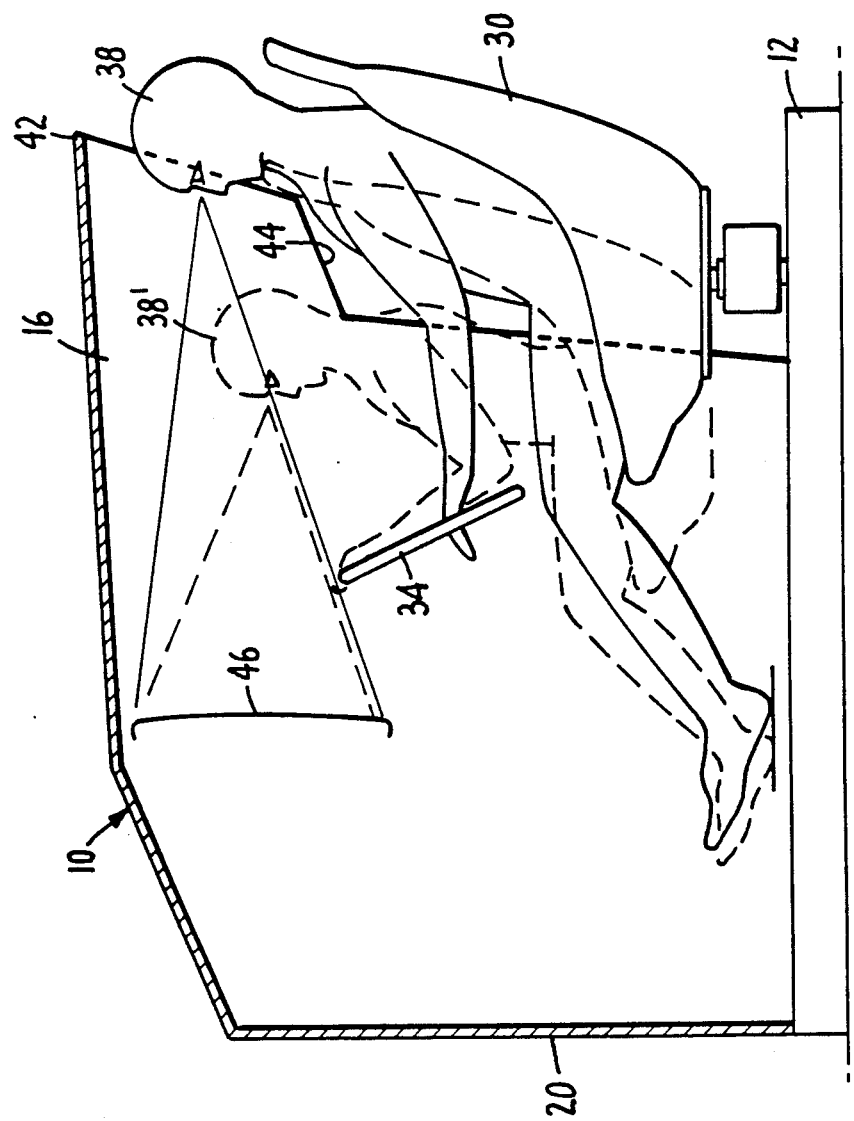
FIG. 3 is a schematic depiction of a large and small sized game player positioned in the booth with an adjustable seat illustrating that in all positions the desired field of view interruption is obtained.

A key feature to the present invention is the geometry of the enclosure which is designed to provide at least about 180° of interruption of the horizontal field of view of the video game player when seated in the seat looking straight ahead at the front wall. This is illustrated in FIG. 3. In FIG. 3 a large adult player 38 and small child player 38', are superimposed on a side view of the device 10. In the drawing it can be seen that the rear edge 42 of wall 16 interrupts the large adult player's field of vision at each side defining an enclosed area extending over about 180 20 from the side through the front to the other side of his field of vision. With the child player 38', the sides 16 and 18, not shown, and front 20 provide more than 180° of field of vision interruption. As can be seen this allows both size players to focus their attention on screen 46. As shown in this figure the rear edge 42 may be notched such as notch 44 at its lower levels without impeding, the effectiveness of the shield. This can be advantageous to facilitate entrance and exit. It is important to note that in device 10 the entire rear aspect of the player is open. Surprisingly, this has been found to not lead to distraction of the player. Large numbers of spectators, often numbering twenty or more, can gather behind the player and watch as he plays the game.

Figure 4:
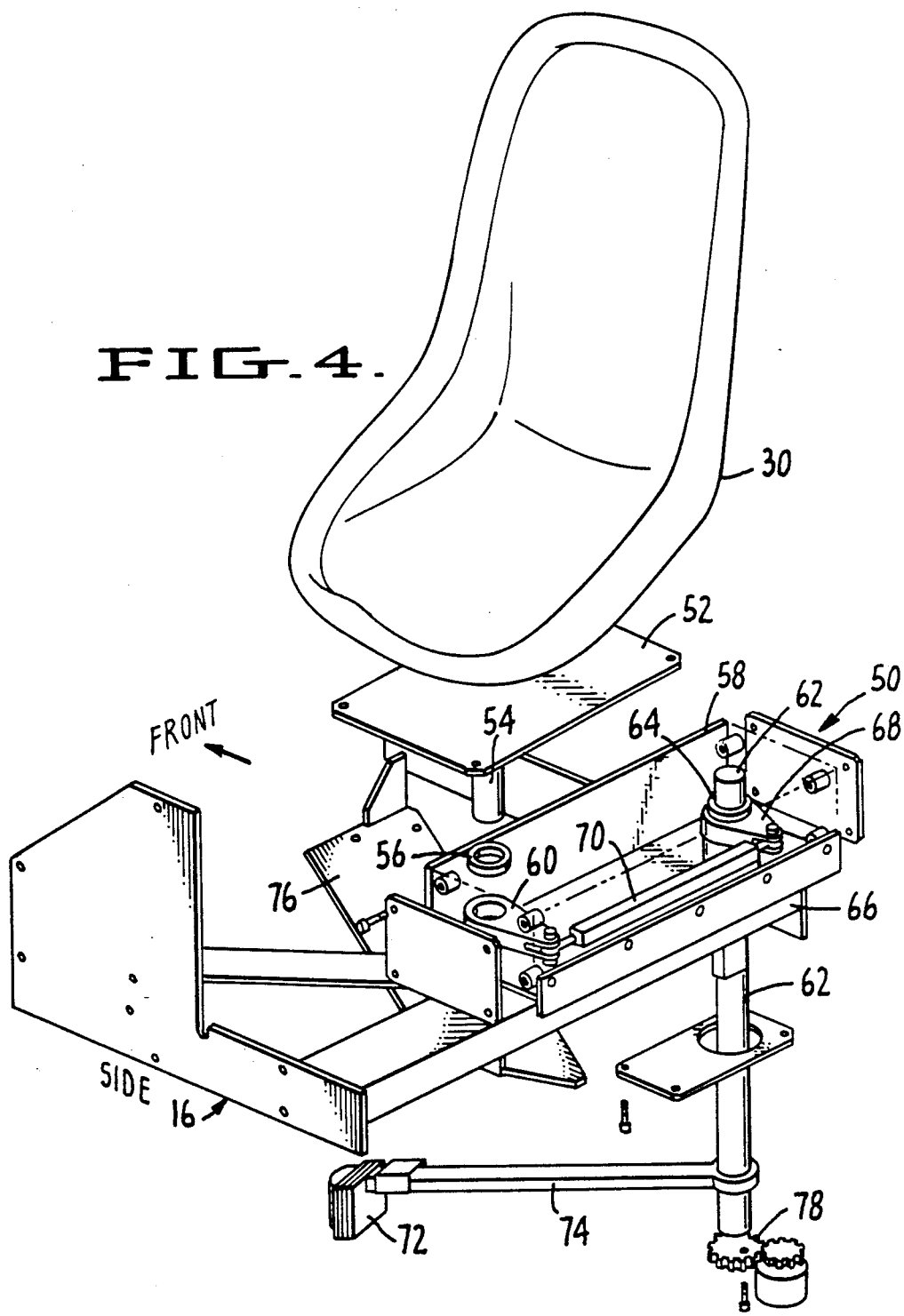
FIG. 4 is a partially exploded view of a seat adjusting mechanism.

As can be seen in FIG. 3, in preferred embodiments of this invention, the seat 30 is capable of moving forward and backward within the enclosure 10. One mechanism for effecting this motion is illustrated in FIG. 4 as seat movement mechanism 50. Mechanism 50 is located substantially under floor 14. It is positioned with side 16 located as shown and the front of enclosure 10 shown in the direction of the "front" arrow. In this mechanism seat 30, which should be rotated 90° clockwise from the position shown, is mounted upon seat plate 52 which is affixed to seat axle 54. Seat axle 54 passes through bushing 56 in support tube 58. Seat axle 54 is joined to seat arm 60 and can pivot in bushing 56. Support tube 58 is attached to support axle 62 which pivots in bushing 64 attached to fixed frame 66. Control arm 68 is also affixed to bushing 64 and therefore joined to base 66. Control link 70 joins control arm 68 to seat arm 60. Thus, the two control arms, the control link and the support tube give rise to a four lever linkage which controls the rotational position of chair axle 54 relative to support axle 62. This has the function of allowing chair 30 to face the front with only very minor angular deviation through a substantial front and back motion of chair axle 54. Conversely, when the chair axle is moved beyond the rearmost game playing position this four lever linkage permits substantial counterclockwise rotation of the chair so as to facilitate entry and exit from the booth.

This ability to move the seat forward and backward is important for adjusting- the position for effective play and also important for facilitating entry and exit. However, during play, it is desirable that the seat be locked in position so as to not go forward and backward as the player plays the game. One mechanism for effecting this locking can be as shown in FIG. 4 where an electromagnet 72 is shown affixed to support axle 62 by magnet arm 74. When assembled magnet 72 is located adjacent to steel magnet plate 76. When magnet 72 is energized it grips plate 76, thus preventing easy forward and backward motion of seat 30. In a typical game setting this magnet is not turned on until play is about to begin, as indicated, for example, by the player inserting a coin or token in the game and carrying out other pregame functions such as selecting mode of play and the like. Once these initial functions have been carried out, the game can automatically turn on magnet 72 and lock the seat position. In the embodiment of the game shown, an auto driving game, the dashboard of the game additionally includes a lighted "seat adjust" button. This button may be pushed to turn off the magnet and permit other adjustment of the seat during the play of the game. In some modes, it is desirable to note the position of the seat. This can be carried out, for example, by having gear sector 78 attached to axle 62. Gear sector 78 drives a variable resistor, to give resistances proportional to seat position. The information derived from this indicator can be used to adjust parameters of the game, for example, adapting the game play to the skills of younger players when the seat is forward and to the skills of adults when the seat is in a more rear position.

In another mode, when the seat is pushed back beyond the rearmost game playing position, the magnet may be permanently disabled, since the player is not facing the game screen and thus is not playing the game.

Another feature which is possible when a position indicator such as 78 is present is that the rate of change of position may be determined as well. If the rate of change of position is too great, indicative of wild uncontrolled action, the magnet could be re-energized at least partially to dampen such action and prevent injury to the player.

The four lever linkage described herein provides a very effective seat adjustment geometry allowing substantial fore and aft position change for the seat which minimal seat angle deviation from straight ahead. In FIG. 5 this is illustrated diagrammatically. In FIG. 5A "0" is a reference line taken through support axle 62 perpendicular to the Front-rear center line "90" drawn between the center of the seat axle 54 and the center of the game monitor in front of the player in the seat. In FIG. 5A the seat is moved forward from reference line "0" a distance $D^1$ by rotating the line between axles 54 and 62 by an angle $+A$. This angle $+A$ can have a value of up to about 20°. When a positive angle A is present this causes some small angle of deflection B in the seat position. When angle +A is 20°, B is about 2.3°. When angle +A is 10°, B is less that 1°. In FIG. 5B, it can be seen that when angle A is ) there is no substantial displacement of the seat position.. In FIG. 5C, the seat axle 54 is moved in to a back game playing position a distance $D^2$ behind line 0. In practice $D^1$ plus $D^2$ can total as much as 8 to 10 inches. This accommodates virtually all sizes of game players. In the rear direction, the seat can be moved through an angle −A. When angle −A is 20°, B is about 2.3°. When angle −A is 40°, B is still relatively small, generally being about 10°. This is seen as about the outer limit for seat angle misalignment. In FIG. 5D, it can be seen that when angle −A is increased beyond about 40° angle B increases dramatically. When angle −A is 90° as shown in FIG. 5D, angle B is substantial, such as 45°. This pivoting of the seat in the last portion of the rearward movement of the seat is very important to facilitating entry and exit into the seat. When the seat it moved forward, the seat quickly aligns with the game screen and immediately thrusts the player into the game environment.

Although this invention has been described with reference being made to certain specific embodiments and configurations, it will be appreciated that these have been presented to exemplify the invention and describe the best modes to practice it and are not to be construed as limitations on its scope which is instead defined by the following claims.

What is claimed is:

1. A floor-standing video game player enclosure booth comprising an elevated rectangular base having a front end, a rear end and two sides, the sides being longer than the ends, a front wall affixed to and extending upwards from the front end of the base and two side walls affixed to and extending upwards from the sides of the base and a roof affixed to the upper edges of the front wall and side walls thereby forming an open-at-the-rear booth; a player seat movably mounted to said base said player seat being moveable to a plurality of game-playing positions facing the front wall, said positions varying from one another by being closer to and further from the front wall and thereby adapted for smaller and larger game players and all of said game playing positions being located within the open-at-the-rear booth such that the horizontal field of view of a video game player seated in the seat and looking straight ahead at the front wall is interrupted on at least 180° by the front and side walls and said player seat also being moveable further to the rear than the rearmost game-playing position to facilitate player entry and exit.

2. The floor-standing video game player enclosure booth of claim 1 comprising means for holding the seat substantially facing the front wall when in any of the game playing positions.

3. The floor-standing video game player enclosure booth of claim 2 wherein the means for holding the seat substantially facing the front wall when in the game playing position hold the seat to within about 3° of directly facing the front wall.

4. The floor-standing video game player enclosure booth of claim 3 additionally comprising means for effecting rotation of the seat when further to the rear than the rearmost game-playing position.

5. The floor-standing video game player enclosure booth of claim 4 wherein the means for effecting rotation of the seat rotate the seat by at least about 30° when further to the rear than the rearmost game-playing position.

6. The floor-standing video game player enclosure booth of claim 5 wherein the means for effecting rotation of the seat and the means for holding the seat substantially facing the front wall when in the game playing position comprise a four lever linkage pivotable on a horizontal plane.

7. The floor-standing video game player enclosure booth of claim 6 additionally comprising means for locking the seat in a game playing position.

8. The floor-standing video game player enclosure booth of claim 2 additionally comprising means for effecting rotation of the seat when further to the rear than the rearmost game-playing position.

9. The floor-standing video game player enclosure booth of claim 1 additionally comprising means for permitting rotation of the seat when further to the rear than the rearmost game-playing position.

10. The floor-standing video game player enclosure booth of claim 9 additionally comprising means for effecting rotation of the seat when further to the rear than the rearmost game-playing position.

11. The floor-standing video game player enclosure booth of claim 10 wherein the means for effecting rotation of the seat rotate the seat by at least about 30° when further to the rear than the rearmost game-playing position.

12. The floor-standing video game player enclosure booth of claim 11 wherein the means for effecting rotation of the seat and the means for holding the seat substantially facing the front wall when in the game playing position comprise a four lever linkage pivotable on a horizontal plane.

13. The floor-standing video game player enclosure booth of claim 1 additionally comprising means for locking the seat in a game playing position.

14. The floor-standing video game player enclosure booth of claim 13 wherein said means for locking the seat in a game playing position includes an electromagnet which is activated when the video game is being played.

15. The floor-standing video game player enclosure booth of claim 1 additionally comprising means for identifying the seat position.

16. The floor-standing video game player enclosure booth of claim 15 additionally comprising means for deactivating the electromagnet when the seat is further to the rear than the rearmost game playing position.

* * * * *